United States Patent
Lee et al.

(10) Patent No.: US 8,441,593 B2
(45) Date of Patent: May 14, 2013

(54) RECEIVING CONTAINER AND DISPLAY DEVICE HAVING THE SAME, AND METHOD THEREOF

(75) Inventors: Chul-Woo Lee, Asan-si (KR); Young-Jae Lee, Yongin-si (KR); Jin-Ho Cho, Cheonan-si (KR); Jae-Woo Jang, Suwon-si (KR); Jong-Young Yun, Seoul (KR); Neung-Beom Lee, Asan-si (KR)

(73) Assignee: Samsung Display Co., Ltd. (KR)

( * ) Notice: Subject to any disclaimer, the term of this patent is extended or adjusted under 35 U.S.C. 154(b) by 441 days.

(21) Appl. No.: 12/432,125

(22) Filed: Apr. 29, 2009

(65) Prior Publication Data

US 2009/0279015 A1    Nov. 12, 2009

(30) Foreign Application Priority Data

May 9, 2008    (KR) .................................. 2008-43328

(51) Int. Cl.
*G02F 1/1333*    (2006.01)
(52) U.S. Cl.
USPC .............................................. 349/58; 349/60

(58) Field of Classification Search .............. 349/58–60; 362/632–634
See application file for complete search history.

(56) References Cited

U.S. PATENT DOCUMENTS

| | | | |
|---|---|---|---|
| 2004/0246397 A1 * | 12/2004 | Kang et al. ....................... | 349/58 |
| 2005/0280750 A1 * | 12/2005 | Cho et al. ........................ | 349/58 |
| 2007/0047265 A1 | 3/2007 | Kang et al. | |
| 2007/0115401 A1 * | 5/2007 | Tsubokura et al. ............. | 349/58 |
| 2007/0132906 A1 | 6/2007 | Shen et al. | |
| 2008/0030641 A1 * | 2/2008 | Kim et al. ....................... | 349/58 |
| 2009/0079894 A1 * | 3/2009 | Okuda ............................ | 349/58 |

* cited by examiner

*Primary Examiner* — Bumsuk Won
*Assistant Examiner* — Charles Chang
(74) *Attorney, Agent, or Firm* — Cantor Colburn LLP

(57) ABSTRACT

A receiving container includes a frame member and a first reinforcing member. The frame member is formed of a plastic material. The frame member includes a bottom part of which a center portion is opened and sidewalls respectively extending from peripheral edges sides of the bottom part. The first reinforcing member is separably disposed internally within at least one of the sidewalls, and disposed substantially parallel to a length direction of the at least one of the sidewalls, the first reinforcing member reinforcing a strength of the at least one of the sidewalls.

21 Claims, 6 Drawing Sheets

100

RECEIVING CONTAINER AND DISPLAY DEVICE HAVING THE SAME, AND METHOD THEREOF

This application claims priority to Korean Patent Application No. 2008-43328, filed on May 9, 2008, and all the benefits accruing therefrom under 35 U.S.C. §119, the contents of which are incorporated herein by reference in their entirety.

BACKGROUND OF THE INVENTION

1. Field of the Invention

Embodiments of the present invention relate to a receiving container and a display device having the receiving container. More particularly, embodiments of the present invention relate to a receiving container to receive modules employed in a flat display device and a display device having the receiving container.

2. Description of the Related Art

A liquid crystal display ("LCD") device unlike a cathode ray tube ("CRT") or a plasma display panel ("PDP") requires a separate light source for displaying images. The LCD device includes a LCD panel and a backlight assembly. The LCD panel selectively transmits light generated by the backlight assembly based on a display signal to display the images.

A cold cathode fluorescent lamp ("CCFL") is generally used as the light source of the backlight assembly. The backlight assembly includes a direct-type backlight assembly and an edge-type backlight assembly. In the direct-type backlight assembly, the light source is disposed directly under the display panel. In the edge-type backlight assembly, a liquid guide plate is disposed directly under the display panel and the light source is disposed adjacent to a side of the light guide plate.

Compared to the CRT, the LCD device is thinner and lighter, and consumes less power. In order to maximize the advantages of the LCD device, technical solutions for reducing the thickness and the weight of the LCD device are being developed.

The liquid crystal display panel and the light source are generally received in a receiving container including a metallic chassis.

BRIEF SUMMARY OF THE INVENTION

Since the LCD device includes a light source received in a receiving container including a metallic chassis, there are technical difficulties in manufacturing an LCD device with a relatively slim thickness and light weight. For example, a weight of the receiving container including the metallic chassis contributes to a total weight of the LCD device, such as being about a half of the total weight of the LCD device. In order to reduce the total weight of the LCD device, the weight of the receiving container including the metallic chassis may be reduced.

Exemplary embodiments of the present invention provide a receiving container capable of reducing weight and thickness of a liquid crystal display ("LCD") device, and the number of modules employed in the LCD device.

Exemplary embodiments of the present invention also provide a display device having the receiving container.

In one exemplary embodiment of the present invention, there is provided a receiving container. The receiving container includes a frame member and a first reinforcing member.

The frame member may be formed of a plastic material. The frame member includes a bottom part of which a center portion is opened and sidewalls respectively extending from peripheral edges of the bottom part. The first reinforcing member may be separably or removably disposed within at least one of the sidewalls and substantially parallel to a length direction of the at least one of the sidewalls, to reinforce strength of at least one of the sidewalls.

At least one of sidewalls may include a first internal receiving space in which the first reinforcing member is received.

The first reinforcing member may be disposed on an internal surface of the at least one of the sidewalls, and the first reinforcing member and at least one of the sidewalls may be combined with each other by a screw.

The bottom part of the frame member includes an edge part and center parts. The edge part may be defined by the peripheral edges of the bottom part, and internal sides defining the opened center portion of the bottom part. The center parts divide the opened center portion into a plurality of sub-openings. The receiving container may further include second reinforcing members disposed substantially parallel to the center parts and to a plane of the bottom part of the frame member, the second reinforcing member reinforcing strengths of the center parts.

The receiving container may further include grounding members. The grounding members may respectively overlap an entire of the sub-openings. The grounding members may include a metallic material and have a substantially mesh shape.

The frame member may further include a plurality of lamp socket receivers formed as a single and continuous body with the bottom part of the frame member. Each of the lamp socket receivers may include a contact hole extending through the bottom part of the frame member, and a lamp socket supporter protruding from a rear surface of the bottom part of the frame member, covering the contact hole and supporting a lamp socket inserted into the contact hole.

In one exemplary embodiment of the present invention, there is provided a display device. The display device includes a back receiving container, a backlight assembly, a display panel assembly, and a front receiving container.

The back receiving container includes a back frame member and a first reinforcing member. The back frame member may be formed of a plastic material. The back frame member includes a bottom part of which a center portion is opened and sidewalls respectively extending from external sides of the bottom part. The bottom part of the frame member may include an edge part and center parts. The edge part may be defined by the external sides of the bottom part and internal sides defining the opened center portion of the bottom part. The center parts may divide the opened center portion into a plurality of sub-openings. The first reinforcing member may be detachably coupled with at least one of the sidewalls and disposed substantially parallel to a length direction of the at least one of the sidewalls to reinforce strength of the at least one of the sidewalls. The backlight assembly is received in the back receiving container and generates light. The display panel assembly is disposed on the backlight assembly and displays images using the light. The front receiving container exposes a display area of the display panel assembly and combines with the back receiving container.

Two sidewalls which are opposite to each other may respectively have first internal receiving spaces. Each of the first receiving spaces may receive the first reinforcing member.

Alternatively, the first reinforcing member may be disposed on an internal surface of the at least one of the sidewalls, and the first reinforcing member and the at least one of the sidewalls may be combined with each other by a screw.

The back receiving container may further include a second reinforcing member disposed substantially parallel to at least one of the center parts and to a plane of the bottom of the back frame member to reinforce strengths of at least one of the center parts.

The front receiving container may include a front frame member and a third reinforcing member. The front frame member may be formed of a plastic material. The front frame member may include a bottom part and sidewalls. A center portion of the bottom part may be opened to expose the display area of the display panel assembly. The bottom part of the front frame member supports an edge portion of the display panel assembly. The sidewalls of the front frame member may extend from external sides of the bottom part of the front frame member and respectively correspond to the sidewalls of the back frame member. The third reinforcing member may be separably disposed internally within at least one sidewall of the front frame member which is substantially perpendicular to the two sidewalls of the back frame member, the third reinforcing member being disposed substantially parallel to a length direction of the at least one sidewall of the front frame member. The at least one sidewall of the front frame member may include a second internal receiving space formed therein. The second internal receiving space may receive the third reinforcing member.

The display panel assembly includes a display panel, a panel driving board, and a source flexible printed circuit film.

The display panel may have the display area on which the images are displayed using the light. The panel driving board may be disposed on a rear surface of the bottom part of the back frame member adjacent to the sidewall of the back frame member having the first reinforcing member. The panel driving board may output a control signal to control image display of the display panel. The source flexible printed circuit film may electrically connect the panel driving board and the display panel with each other.

The back receiving container may further include a plurality of grounding members. The grounding members may be formed of a metallic material. The grounding member may respectively cover the sub-openings and have a mesh shape. Each of the grounding members may have a connection member protruding from an end thereof. The connection member of each grounding member may make contact with adjacent grounding member.

The display device may further include a protective cover. The protective cover may cover the panel driving board disposed on the rear surface of at least one of the grounding members. The protective cover may be electrically connected to a grounding terminal of the panel driving board and at least one of the grounding members.

A portion of the sidewall of the back frame member at which the first reinforcing member is disposed may be removed to expose a portion of the first reinforcing member. The back receiving container may further include a conductive connection member. The conductive connection member may electrically connect the exposed first reinforcing member and the protective cover with each other.

The conductive connection member may include one of a conductive adhesive film attached to the first reinforcing member and the protective cover and a combining screw combining the first reinforcing member with the protective cover.

The display panel assembly may further include a signal transferring board and a connection flexible printed circuit film.

The signal transferring board may be electrically connected to the source flexible printed circuit film. The signal transferring board may be disposed on an external surface of the sidewall of the back frame member at which the first reinforcing member is disposed. The signal transferring board receives the control signal and applies the data signal for displaying the image to the display panel. The connection flexible printed circuit film may electrically connect the signal transferring board and the panel driving board with each other.

The back frame member may further include a plurality of lamp socket receivers integrally formed with the bottom part of the back frame member. Each of the lamp socket receivers may include a contact hole passing through the bottom part of the back frame member and a lamp socket supporter protruding from a rear surface of the bottom part of the back frame member to cover the contact hole.

The backlight assembly may include a reflective member, a plurality of lamps and a plurality of lamp sockets. The reflective member may be disposed on a front surface of the bottom part of the back frame member to cover the sub-openings. The lamps may be disposed on the reflective member. The lamps may be substantially parallel to the first reinforcing member. The lamp sockets may respectively combine with end portions of the lamps. The lamp sockets may be inserted into the contact holes of the lamp socket receivers and supported by the lamp socket supporters of the lamp socket receivers. The lamp sockets may have portions respectively exposed by the lamp socket receivers.

The backlight assembly may further include a power supplying board disposed on the rear surface of the back receiving container and electrically connected to the lamp sockets.

According to the exemplary embodiments of the present invention, since the receiving container is formed of the plastic material, the weight of the display device may be advantageously reduced.

Further, since the lamp socket receivers for arranging the lamp sockets are formed as a single and continuous unit with the receiving container formed of the plastic material, the number of modules employed in the display device may be advantageously reduced.

Furthermore, since the back frame member is formed of the plastic material, the current leakage from the lamps to the back frame member may be reduced or effectively prevented. Advantageously, a distance between the lamps and the bottom part of the back frame member may be reduced so that the display device may have an overall thin thickness.

BRIEF DESCRIPTION OF THE DRAWINGS

The above and other features and advantages of the present invention will become readily apparent by reference to the following detailed description when considered in conjunction with the accompanying drawings wherein.

DETAILED DESCRIPTION OF THE INVENTION

Figure 1:
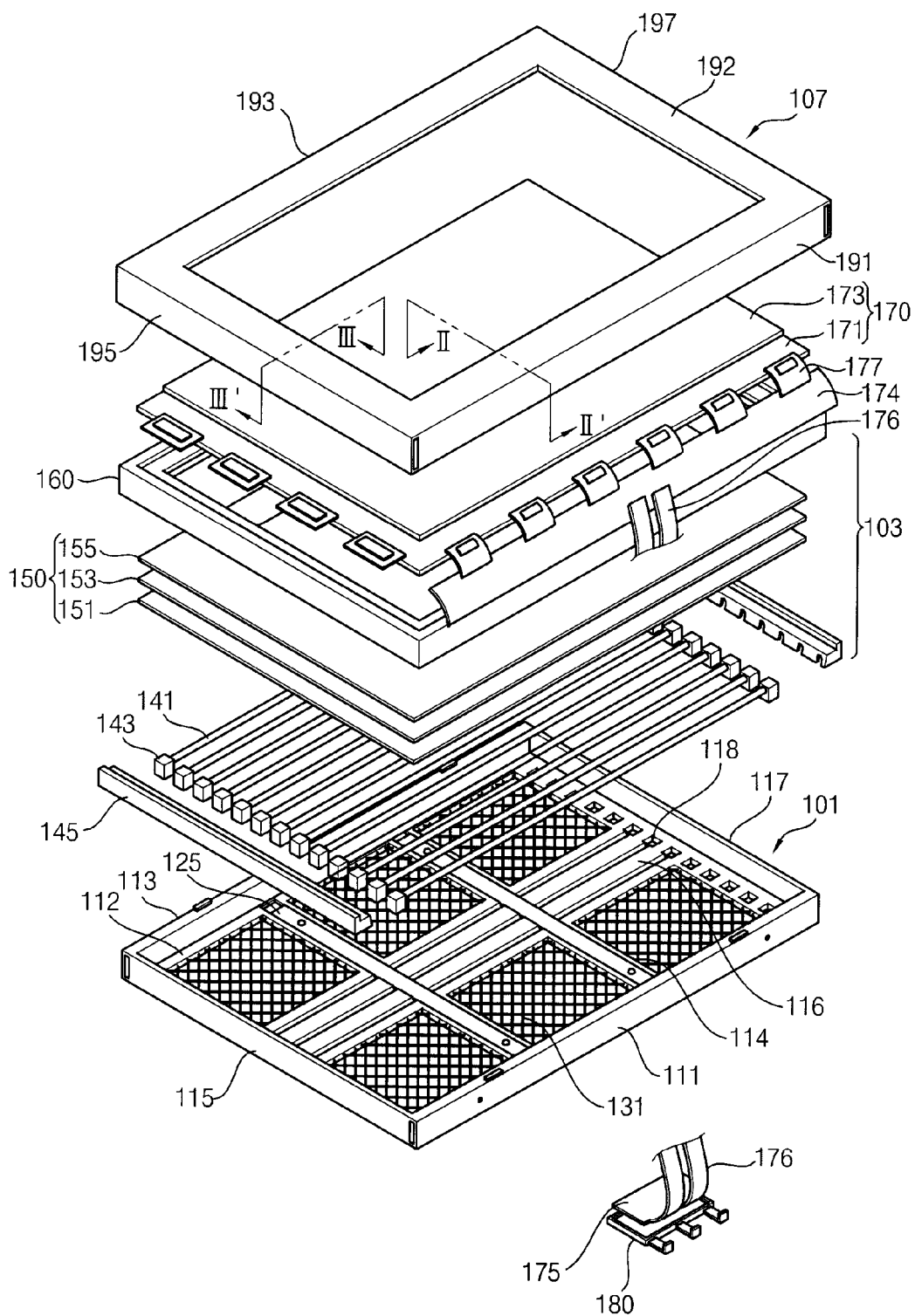
FIG. 1 is an exploded perspective view illustrating an exemplary embodiment of a display device in accordance with the present invention.

The present invention is described more fully hereinafter with reference to the accompanying drawings, in which exemplary embodiments of the present invention are shown. The present invention may, however, be embodied in many different forms and should not be construed as limited to the exemplary embodiments set forth herein. Rather, these exemplary embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "lower" other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional illustrations that are schematic illustrations of idealized exemplary embodiments (and intermediate structures) of the present invention. As such, variations from the shapes of the illustrations as a result, for example, of manufacturing techniques and/or tolerances, are to be expected. Thus, exemplary embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be explained in detail with reference to the accompanying drawings.

Figure 2:
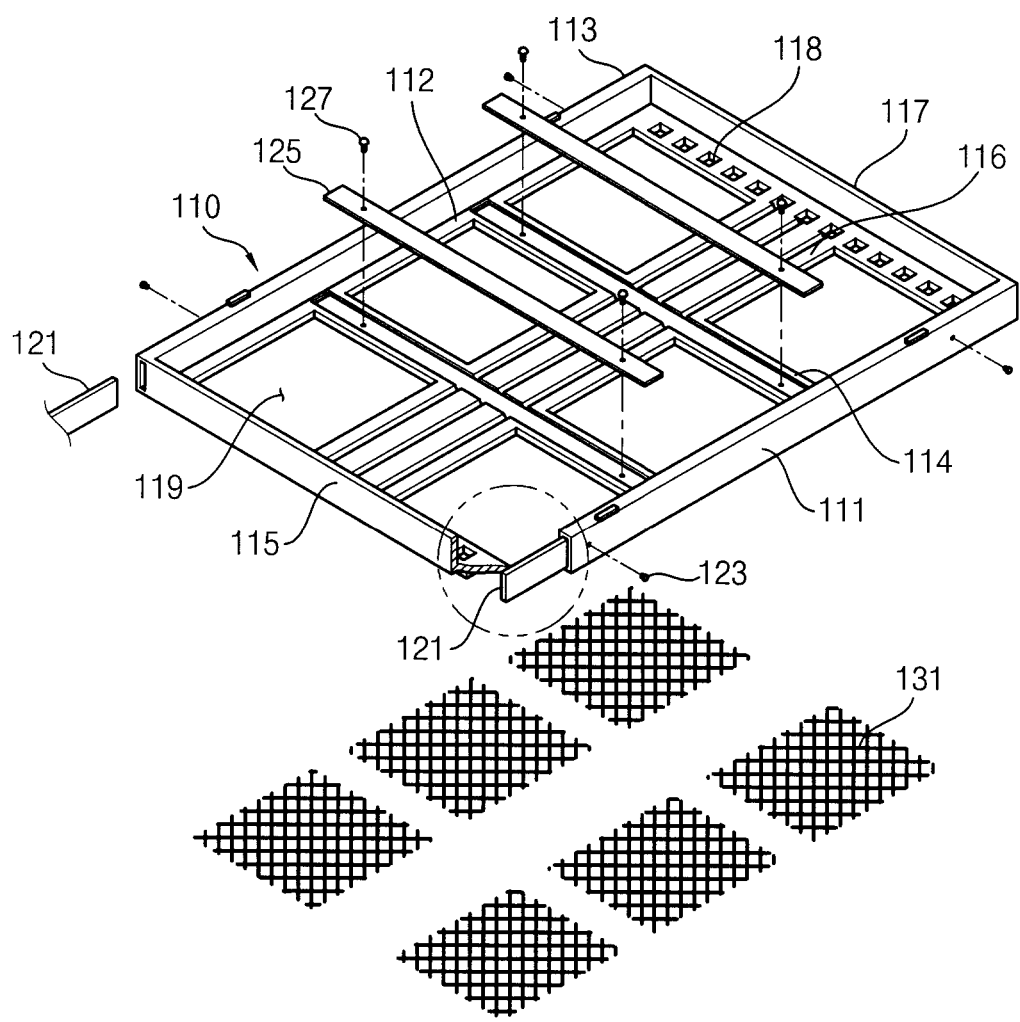
FIG. 2 is an exploded perspective view illustrating an exemplary embodiment of a back receiving container illustrated in FIG. 1.

FIG. 1 is an exploded perspective view illustrating an exemplary embodiment a display device in accordance with the present invention. FIG. 2 is an exploded perspective view illustrating an exemplary embodiment of a back receiving container illustrated in FIG. 1.

Referring to FIGS. 1 and 2, a display device 100 includes a back receiving container 101, a backlight assembly 103, a display panel assembly, and a front receiving container 107.

The back receiving container 101 includes a back frame member 110, a first reinforcing member 121 and a second reinforcing member 125.

The back frame member 110 may be formed substantially of a plastic material so that the display device 100 may be lighter than a conventional display device employing a receiving container formed of a metal. In an exemplary embodiment, the back frame member 110 may be formed by a molding method. The back frame member 110 includes a bottom part and sidewalls. The bottom part may include an edge part 112 and a plurality of center parts.

The edge part 112 may have a substantially rectangular frame shape. In one exemplary embodiment, the edge part 112 may have a substantially rectangular plate shape of which a center portion is substantially opened in a rectangular shape. The edge part 112 may have internal sides which define an outline of the opened center portion of the edge part 112, and external sides which define an outline of the edge part 112. The internal sides and the external sides may form a rectangle, respectively. As in the illustrated embodiment, the internal sides and the external sides may have two long sides and two short sides, respectively.

In exemplary embodiments of the present invention, the sidewalls of the back receiving container 110 include a first sidewall 111, a second sidewall 113, a third sidewall 115, and a fourth sidewall 117. The first and second sidewalls 111 and 113 are extended from the two long sides of the external sides of the edge part 112, respectively. The third and fourth sidewalls 115 and 117 are extended from the two short sides of the external sides of the edge part 112, respectively.

Figure 3:
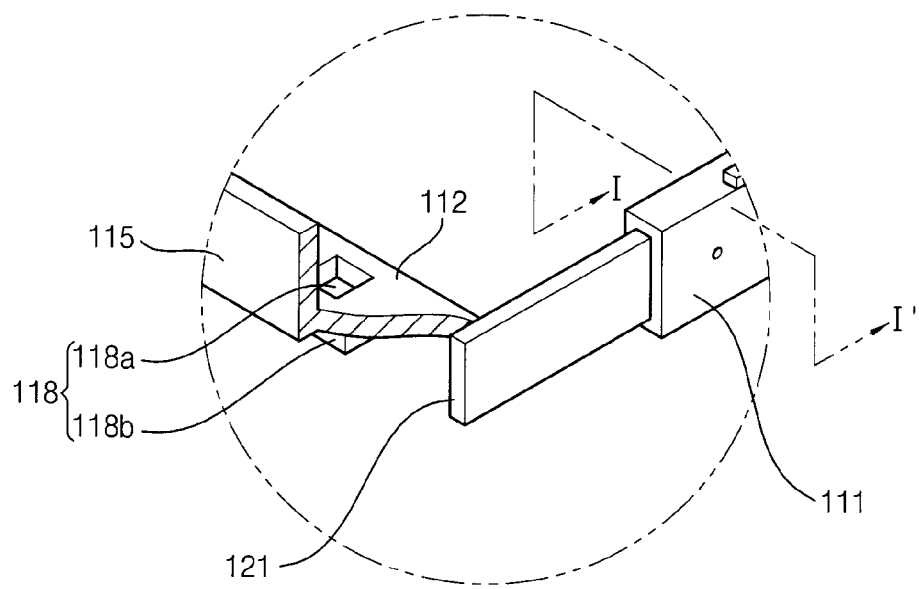
FIG. 3 is a partial perspective view illustrating an exemplary embodiment of a combination of a back frame member and a first reinforcing member employed in the back receiving container illustrated in FIG. 2.
Figure 4:
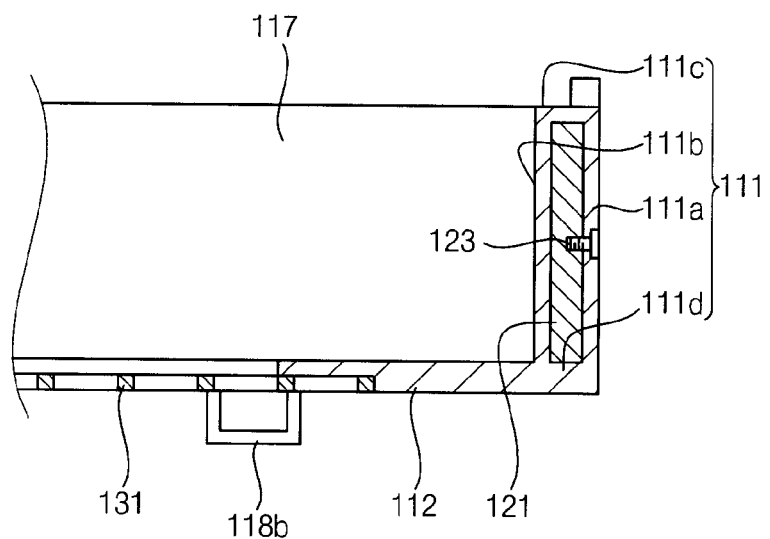
FIG. 4 is a cross-sectional view taken along line I-I' shown in FIG. 3.

FIG. 3 is a partial perspective view illustrating an exemplary embodiment of a combination of a back frame member and a first reinforcing member employed in the back receiving container illustrated in FIG. 2. FIG. 4 is a cross-sectional view taken along line I-I' shown in FIG. 3. In FIG. 3, a portion of the first sidewall 111 is removed for illustrating the first reinforcing member 121 combined with the back frame member. FIGS. 3 and 4 only illustrate the first reinforcing member 121 combined with the first sidewall 111, but the first reinforcing member 121 may be combined with the second sidewall 113 in a substantially same method. The first reinforcing member 121 combined with the first sidewall 111 will be described hereinafter, and an explanation of the first reinforcing member 121 combined with the second sidewall 113 will be omitted.

Referring to FIGS. 3 and 4, since the back frame member 110 is formed of the plastic material, the back frame member 110 has a relatively light weight and small strength. In order to reinforce the small strength of the back frame member 110, the first reinforcing member 121 is combined with the first sidewalls 111. In one exemplary embodiment, the first reinforcing member 121 may include aluminum, having a substantially bar shape which is parallel to a length (e.g., longitudinal) direction of the first sidewall 111. The first reinforcing member 121 may reinforce the strength of the first sidewall 111.

The first reinforcing member 121 may be combined with the first sidewall 111 in various methods. In one exemplary embodiment, the first reinforcing member 121 may be fixed to an internal surface of the first sidewall 111 by a retaining member, such as a screw.

Alternatively, in exemplary embodiments of the present invention, the first sidewall 111 may have an internal receiving space to receive the first reinforcing member 121, such as illustrated in FIGS. 2 and 3. The internal receiving space may be void of a material forming the first sidewall, such as may be referred to as a hollow area of the first sidewall 111. In one exemplary embodiment, an end surface of the first sidewall 111 may have a hole or an open area connected to the internal receiving space. The first reinforcing member 121 may be slid to the internal receiving space through the hole, to be combined with the first sidewall 111. The first reinforcing member 121 may have a length which is substantially equal to or smaller than that of the first sidewall 111. The length of the first sidewall 111 is taken from a first end surface to a second end surface of the first sidewall 111.

Referring to FIG. 4, the first sidewall 111 may include an external part 111a, an internal part 111b, an upper part 111c, and a lower part hid which form the internal receiving space of the first sidewall 111. The external part 111a, the internal part 111b, the upper part 111c, and the lower part hid may be referred to as solely defining the internal receiving space of the first sidewall 111. The external part 111a, the internal part 111b, the upper part 111c, and the lower part hid may collectively form a single, continuous and indivisible unit, and be included as part of the back receiving container 101. The internal receiving space of the first sidewall 111 may extend completely through the sidewall 111, where the internal receiving space may be accessed from each distal end of the sidewall 111. The internal receiving spaced may be considered completely surrounded or enclosed by the external part 111a, the internal part 111b, the upper part 111c, and the lower part 111d.

The external part 111a and the internal part 111b face to each other, and the first reinforcing member 121 is interposed between the external part 111a and the internal part 111b. The first reinforcing member 121 disposed in the first sidewall 111 is slidably disposed between the external part 111a and the internal part 111b, such that the first reinforcing member 121 is retained between the external part 111a and the internal part 111b. The first reinforcing member 121 may be solely retained by a friction or interference fit with the external part 111a and the internal part 111b, or may be retained with the assistance of the retaining member, such as the screw. The upper part 111c faces an upper end of the first reinforcing member 121 and connects an upper end of the external part 111a with an upper end of the internal part 111b. The lower part hid faces a lower end of the first reinforcing member 121 and connects a lower end of the external part 111a with a lower end of the internal part 111b. Inner surfaces of the external part 111a, the internal part 111b, the upper part 111c, and the lower part hid may completely overlap an entire of the corresponding facing external surfaces of the first reinforcing member 121.

The first reinforcing member 121 may have a size and a shape which are substantially the same as those of the internal receiving space of the first sidewall 111, so that the first reinforcing member 121 may be combined with the first sidewall 111. The first reinforcing member 121 may directly contact all or some of the internal surfaces of the external part 111a, the internal part 111b, the upper part 111c, and the lower part 111d.

As illustrated in FIGS. 2 and 4, a first combining member (e.g., a screw) 123 passing through the external part 111a may further combine the first reinforcing member 121 with the first sidewall 111. The first combining member 123 may only pass completely through the external part 111a and only partially into the first reinforcing member 121. Alternatively, the first combining member 123 may pass completely through both the external part 111a and the first reinforcing member 121, and then only partially in to the internal part 111b.

Referring again to FIGS. 1 and 2, in order to reduce the weight of the back frame member 110, the edge part 112 may have the rectangular plate shape of which the center portion is opened as described above. The center part of the bottom part of the back frame member 110 may go across the opened center portion of the edge part 112. In one exemplary embodiment, the center part may connect two opposite sides of the internal sides of the edge part 112 with each other across the opened center portion of the edge part 112. The center part may include a first center part 114 and a second center part 116.

The first center part 114 may be parallel to both the third and fourth sidewalls 115 and 117, and may be extended substantially parallel to a transverse direction of the back frame member 110. In FIG. 2, two first center parts 114 extend across the opened center portion of the edge part 112 in the transverse direction of the back frame member 110 to connect two long sides of the internal sides of the edge part 112. The first center part 114 may have a guide groove formed at an upper surface of the first center part 114. The guide groove may extend partially through a thickness of the first center part 114 taken in a direction perpendicular to a bottom of the back frame member 110, such as in the combining direction of the second combining member 127 shown by dotted lines line in FIG. 2. The guide groove may receive the second reinforcing member 125. In one exemplary embodiment, the second reinforcing member 125 may include aluminum having a substantially bar shape which is parallel to the first center part 114.

The second center part 116 may be parallel to both the first and second sidewalls 111 and 113, and may be extended substantially parallel to a longitudinal direction of the back frame member 110. In FIG. 2, the second center part 116 may be integrally formed with the first center part 114, such that the second center part 116 and the first center part 114 form a single, continuous and indivisible unit. The second center part 116 may have a width taken in the transverse direction of the back frame member 110 which is larger than a width of the first center part 114 taken in the longitudinal direction of the back frame member 110. The second center part 116 may connect two short sides of the internal sides of the edge part 112 across the opened center portion of the edge part 112. The second center part 116 may have one or more of a rib protruding from an upper surface thereof, to reinforce the strength of the back frame member 110. In one exemplary embodiment, the rib may extend in a length direction of the second center part 116, and parallel to the longitudinal direction of the back frame member 110.

The second reinforcing member 125 is disposed in the guide groove formed on the upper surface of the first center part 114. The second reinforcing member 125 may longitudinally extend in a direction substantially parallel to a longitudinal direction of the first center part 114. In an exemplary embodiment, the second reinforcing member 125 may be fixed to the first center part 114 by one or a plurality of a second combining member (e.g., screw) 127 to reinforce the strength of the first center part 114.

The first center part 114 and the second center part 116 divide the opened center portion of the edge part 112 into a plurality of openings 119, which may be hereinafter referred to as sub-openings.

Figure 5:
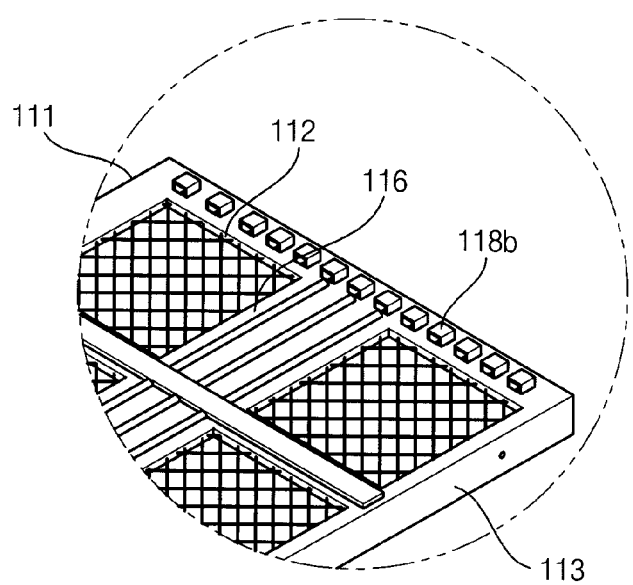
FIG. 5 is a perspective view illustrating an exemplary embodiment of a rear surface of the back receiving container illustrated in FIG. 2.

FIG. 5 is a perspective view illustrating an exemplary embodiment of a rear surface of the back receiving container illustrated in FIG. 2.

Referring to FIGS. 2 and 5, the back receiving container 101 may further include a plurality of grounding members 131 respectively covering the plurality of openings 119. An edge portion of each grounding member 131 may overlap with and/or directly the edge part 112, the first center part 114 and the second center part 116. In one exemplary embodiment, each grounding member 131 may be combined with the edge part 112, the first center part 114 and the second center part 116 by third combining members (e.g., screws) (not shown). Each of the grounding members 131 may include a metal material, such as aluminum, but the present invention is not limited thereto. The grounding members 131 may have a mesh shape or profile for reducing the weight of the back receiving container 101. The mesh profile is used to indicate that the grounding members 131 are not solid members, but may have a reduced thickness at portions thereof, or portions thereof where openings completely penetrate the thickness and there is no material disposed. As illustrated in the exemplary embodiments of FIGS. 1, 2 and 5, the diagonally crossing lines shown as the grounding members 131 are first areas where material of the grounding members 131 is disposed, and second areas alternating with or between the crossing lines are absent the material of the grounding members 131. In a plane view, an area occupied by the grounding members 131 is less than an area of a respective sub-openings of the back frame member 110.

In exemplary embodiments of the present invention, since the back frame member 110 is formed of the plastic material by a molding method, various components may be easily formed in one body with the back frame member 110, such that the various components collectively form a single, continuous and indivisible unit with the back frame member 110. As illustrated in the exemplary embodiment, as shown in FIGS. 2 and 5, lamp socket receivers 118 may be integrally formed with back frame member 110. The lamp socket receivers 118 receive lamp sockets 143 to apply driving voltages to the lamps 141, respectively.

The lamp socket receivers 118 are formed at a portion of the edge part 112 which is adjacent to one of the third and fourth sidewalls 115 and 117. Each of the lamp socket receivers 118 may include a contact hole 118*a* and a socket supporter 118*b* (FIG. 3).

The contact holes 118*a* passes partially or entirely through the edge part 112 and are separated from one another by a predetermined distance. The contact holes 118*a* may be arranged in a direction parallel to the third sidewall 115 or the fourth sidewall 117.

As illustrated in FIGS. 4 and 5, the socket supporters 118*b* are protruded from the rear surface of the edge part 112 to support the lamp sockets 143 inserted into the contact holes 118*a*, respectively. The socket supporters 118*b* respectively correspond to the contact holes 118*a*. The socket supporters 118*b* may respectively include a bottom part separated from the rear surface of the edge part 113 and a sidewall connecting the bottom part with the rear surface of the edge part 112. In exemplary embodiments, the socket supporters 118*b* may respectively have an opening to expose a lower end of the lamp socket 143 passing through the edge part 112.

As described above, since the lamp socket receivers 118 respectively receiving the lamp sockets 143 are integrally formed with the back frame member 110 of the plastic material, and form a single and continuous body with the back frame member 110, the display device in accordance with exemplary embodiments of the present invention may advantageously not require a separate plate for arranging the lamp sockets 143, such as may be employed in the conventional display device.

Figure 6:
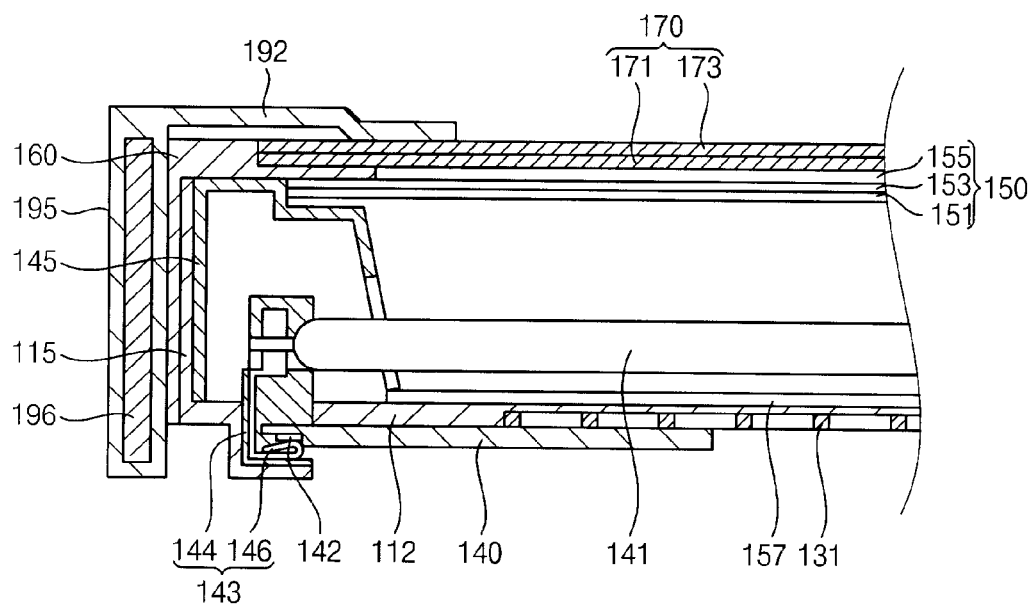
FIG. 6 is a cross-sectional view taken along line III-III' shown in FIG. 1.

FIG. 6 is a cross-sectional view taken along line III-III' shown in FIG. 1.

Referring to FIGS. 1 and 6, the backlight assembly 103 is received in the back receiving container 101 and generates light. The backlight assembly 103 may include a reflective plate 157, a plurality of lamps 141 and a plurality of lamp sockets 143.

The reflective plate 157 reflects the light generated by the lamps 141. The reflective plate 157 is disposed on a front surface of the bottom of the back frame member 110. The front surface indicates a side of the back frame member 110 corresponding to a viewing side of the display device 100 or a side of the back frame member 110 where the display panel 170 is relatively disposed. The reflective plate 157 may cover or overlap an entire of or a portion of the edge part 112, the first and/or second center parts 114 and 116, and the openings 119. As shown in FIG. 6, an edge of the reflective plate 157 is separated from an end edge of the edge part 112. In an exemplary embodiment, the reflective plate 157 may include a flexible sheet. Alternatively, the reflective plate 157 may include a rigid plate.

The lamps 141 are extended in a direction parallel to the length direction of the first and second sidewalls 111 and 113, and arranged in a direction parallel to the length direction of the third and fourth sidewalls 115 and 117. The lamps 141 are disposed on the reflective plate 157. The lamps 141 may include a cold cathode fluorescent lamp ("CCFL"). In exemplary embodiments, each of the lamps 141 may include a lamp tube and an electrode. The lamp tube may include a substantially straight glass tube, a fluorescent layer disposed on an inner surface of the straight glass tube and discharging gas sealed in the straight glass tube. The electrode may be disposed at an end portion of the lamp tube. The electrode may be electrically connected to the lamp socket 143.

The lamp socket 143 transfers lamp driving voltage to the electrode. The lamp socket 143 is received in the lamp socket receiver 118 formed at the back frame member 110, and is combined with the end portion of the lamp 141. The lamp socket 143 may include a socket body 144 and a power applying member 146.

In one exemplary embodiment, the socket body 144 may be formed of a plastic material, such as by using a molding method. The socket body 114 is inserted into the contact hole 118a of the lamp socket receiver 118, and is supported by the socket supporter 118b. The socket body 144 is exposed by the opening of the socket supporter 118b.

The power applying member 146 may include a conductive material. In one exemplary embodiment, the power applying member 146 may be formed of a metal. The power applying member 146 is fixed to the socket body 144. The power applying member 146 may include a power applying terminal and a power receiving terminal. The power applying terminal is electrically connected to the electrode of the lamp 141. The power receiving terminal may protrude over the socket body 144 to be exposed by the opening of the socket supporter 118b.

Referring again to FIG. 3, the backlight assembly 103 may further include a power supplying plate 140. The power applying plate 140 may include a printed circuit board ("PCB") and a power output terminal 142 protruding from a side portion of the PCB. The power supplying plate 140 is disposed on the rear surface of the back frame member 110, and may directly contact the rear surface of the back frame member 110. The power output terminal 142 is inserted into the socket supporter 118b through the opening of the socket supporter 118b to make electric contact with the power receiving terminal of the power applying member 146.

According to exemplary embodiments of the present invention, the back frame member 110 receiving the lamps 141 may be formed of the plastic material which is an insulating material. Advantageously, although the lamps 141 are closely disposed on the first and second center parts 144 and 146 of the back frame member 110, current leakage from the lamps 141 to the first and second center parts 144 and 146 may reduced or effectively be prevented.

When the back frame member 110 is a chassis formed of a metal material and the lamps 141 are closely disposed on a bottom part of the chassis, the current leakage from the lamps 141 to the bottom part of the chassis may be caused. Advantageously, the present invention may reduce a distance between the lamps 141 and the reflective plate 157 disposed on the bottom part of the back frame member 110.

Figure 7:
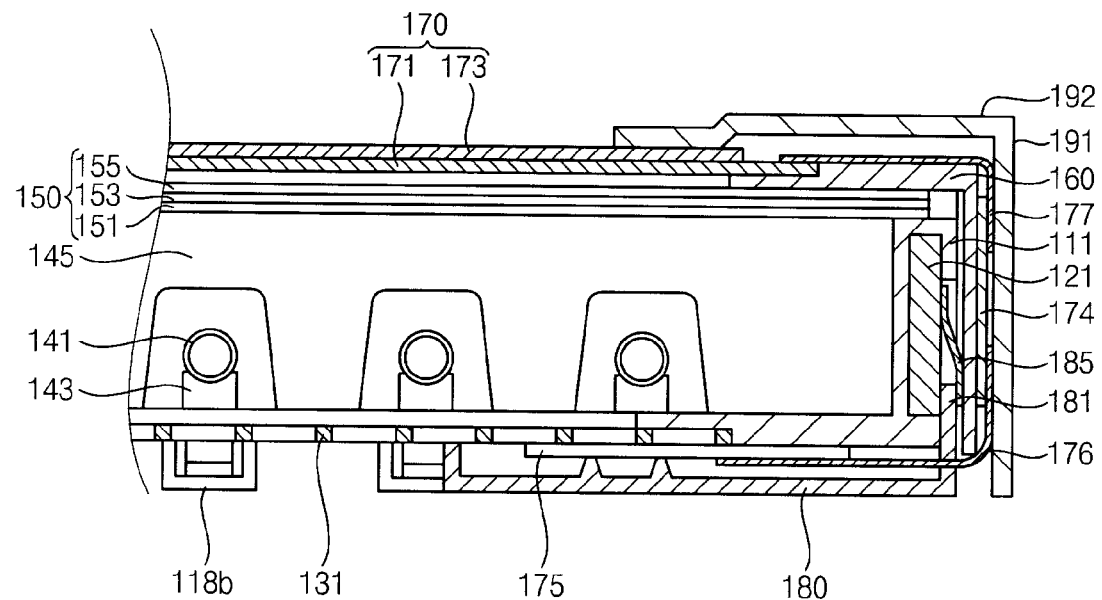
FIG. 7 is a cross-sectional view taken along line II-II' shown in FIG. 1.

FIG. 7 is a cross-sectional view taken along line II-II' shown in FIG. 1.

Referring to FIGS. 1, 6 and 7, the backlight assembly 103 may further include side frames 145, an optical member 150 and a middle frame 160.

The side frames 145 may be disposed adjacent to internal surfaces of the third and fourth sidewalls 115 and 117 of the back frame member 110, respectively. Each of a plurality of the side frames 145 may directly contact the internal surfaces of the third and fourth sidewalls 115 and 117. Each of the plurality of side frames 145 may include two sidewall portions which are supported by the edge part 112 of the back frame member 110 and an upper portion connecting upper ends of the two sidewall portions.

The lamp sockets 143 received in the lamp socket receivers 118 are disposed between the two sidewall portions of a respective side frame 145. In an exemplary embodiment, one of the two sidewall portions may have holes to guide end portions of the lamps 141 into the lamp sockets 143. The upper portion may have a stepped portion to support the optical member 150.

The optical member 150 changes a distribution of light generated by the lamps 141. The optical member 150 may be supported by the upper portions of the side frames 145, and the first and second sidewalls 111 and 113 of the back frame member 110. A lower surface of the optical member 150 may directly contact an upper surface of the upper portions of the side frames 145 and the first and second sidewalls 111 and 113 of the back frame member 110.

The optical member 150 may include a diffusive plate 151, a diffusive sheet 153 and a light concentrative sheet 155, which are sequentially stacked from the upper surface of the upper portions of the side frames 145 and the first and second sidewalls 111 and 113 of the back frame member 110. The diffusing plate 151 diffuses the light generated by the lamps 141 and improves the brightness uniformity of the light. The diffusive sheet 153 again diffuses the diffused light by the diffusive plate 151. The light concentrating sheet 155 concentrates the diffused light and improves the front brightness of the light.

The middle frame 160 presses a peripheral edge portion of the optical member 150 to fix the optical member 150 to a predetermined receiving position, and supports the display panel assembly. In one exemplary embodiment, the middle frame 160 may include a bottom part and a sidewall part. The bottom part of the middle frame 160 may have a substantially rectangular frame shape, of which a center portion may be opened. The bottom part of the middle frame 160 may press the side portion of the optical member 150 and support the display panel assembly. The sidewall part of the middle frame 160 may be extended from an end (e.g., edge) portion of the bottom part of the middle frame 160 and towards the back receiving container 101.

The display panel assembly is disposed on the backlight assembly 103 and displays images using the light provided by the backlight assembly 103. The display panel assembly includes a display panel 170, a panel driving board 175 and a source flexible printed circuit film 177.

The display panel 170 displays the images using the light provided by the backlight assembly 103. The display panel 170 may display the images based on a gate signal and a data signal generated by the panel driving board 175.

The display panel 170 may be one of various flat display panels to be driven by the panel driving board 175. In one exemplary embodiment, the display panel 170 may be a liquid crystal display ("LCD") panel. The display panel 170 may include a lower substrate 171, an upper substrate 173 which is opposite to the lower substrate 171 and a liquid crystal layer interposed between the lower substrate 171 and the upper substrate 173.

The lower substrate 171 may include a lower base substrate, a gate line, a data line, a switching element, a pixel electrode, and a storage electrode. The gate line is formed on the lower base substrate and transfers the gate signal. The data line is insulated from the gate line and transfers the data signal. The switching element is electrically connected to the gate line and the data line and outputs the data signal to the pixel electrode based on the gate signal.

The upper substrate 173 may include red, green and blue color filters which are opposite to the pixel electrodes formed on the lower substrate 171 and a common electrode covering the color filters. An electric field between the pixel electrode and the common electrode is applied to the liquid crystal layer.

The panel driving board 175 outputs a control signal to control the display of the images. The source flexible printed circuit film 177 electrically connects the panel driving board 175 with the display panel 170.

The display panel assembly may further include a data driver, a gate driver and a gate flexible printed circuit film.

The data driver outputs the data signal to the data line. The data driver may be disposed on the source flexible printed circuit film 177. The source flexible printed circuit film 177 is electrically connected to the data line formed on the lower substrate 171.

The gate driver outputs the gate signal to the gate line. The gate driver may be disposed on the gate flexible printed circuit film. The gate flexible printed circuit film is electrically connected to the gate line formed on the lower substrate 171.

The liquid crystal layer is disposed between the lower substrate 171 and the upper substrate 173. An arrangement of the liquid crystal molecules of the liquid crystal layer is changed based on the electric field between the pixel electrode and the common electrode. An amount of light passing through the liquid crystal layer is changed based on the arrangement of the liquid crystal molecules so that the display panel may display images.

Figure 8:
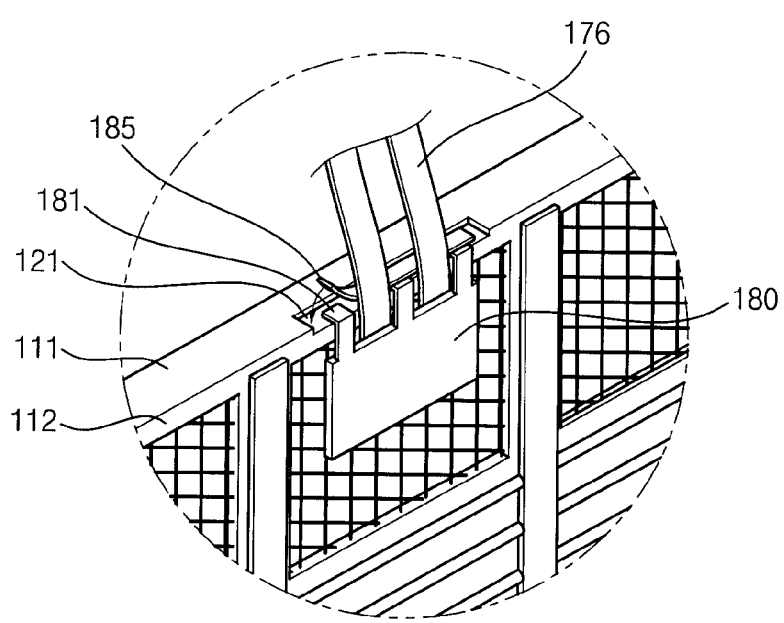
FIG. 8 is a partial perspective view illustrating an exemplary embodiment of a rear surface of the display device illustrated in FIG. 7.

FIG. 8 is a partial perspective view illustrating an exemplary embodiment of a rear surface of the display device illustrated in FIG. 7.

Referring to FIGS. 7 and 8, the panel driving board 175 outputs the control signal to control the display of the images. The control signal may include a data control signal to control the data driver and a gate control signal to control the gate driver.

The panel driving board 175 may be disposed on the rear surface of the bottom part of the back frame member 110. In one exemplary embodiment, the panel driving board 175 may be disposed under (e.g., overlapping) the edge part 112 adjacent to the first sidewall 111, such as illustrated in FIG. 7. The panel driving board 175 may be fixed on the grounding member 131.

The source flexible printed circuit film 177 electrically connects the panel driving board 175 with the display panel 170. The source flexible printed circuit film 177 may extend along an external surface of the middle frame 160 adjacent to the first sidewall 111 of the back frame member 110.

The display panel assembly may further include a signal transferring board 174 and a connection flexible printed circuit film 176.

The signal transferring board 174 receives the gate control signal and the data control signal, and transfers the gate control signal and the data control signal to the gate driver and the data driver, respectively. The signal transferring board 174 may be disposed on the external surface of the middle frame 160 adjacent to the first sidewall 111 of the back frame member 110, such that the signal transferring board 174 directly contacts the external surface of the middle frame 160. The source flexible printed circuit film 177 may be bond to a side of the signal transferring board 174.

The connection flexible printed circuit film 176 electrically connects the panel driving board 175 and the signal transferring board 174 with each other.

Referring again to FIG. 8, the display device 100 may further include a protective cover 180. The protective cover 180 may cover the panel driving board 175 disposed on the grounding member 131. The protective cover 180 may cover and overlap an entire of the panel driving board 175, or may only cover and overlap a portion of the panel driving board 175. The protective cover 180 may reduce or effectively prevent an occurrence of the panel driving board 175 receiving an unnecessary electromagnetic wave from an external device and/or discharge static electricity charged to the panel driving board 175. In an exemplary embodiment, the protective cover 180 may be formed of a metal, such that the panel driving board 175 receiving the unnecessary electromagnetic wave and discharge the static electricity is reduced or effectively prevented.

As illustrated in FIG. 7, the protective cover 180 may include contact protrusions which contact with grounding terminals (not shown) of the panel driving board 175. In one exemplary embodiment, the protective cover 180 may be fixed to the grounding member 131 by fixing member, such as a screw. When the protective cover 180 is fixed to the grounding member 131 by the screw, the protective cover 180 may electrically connect the panel driving board 175 and the grounding member 131 with each other.

Alternatively, the panel driving board 175 may include grounding terminals which make direct contact with the grounding member 131. As illustrated in FIG. 8, a portion of the external part of the first sidewall 111 may be removed so that a portion of the first reinforcing member 121 may be exposed by the removed portion of the external part of the first sidewall 111. Ground lines 181 may be extended from the protective cover 180. The grounding lines 181 may be disposed at and contacting the exposed portion of the first reinforcing member 121, so that the grounding lines 181 electrically connect the panel driving board 175 and the first reinforcing member 121 with each other.

Alternatively, the display device 100 may further include a conductive connection member 185. The conductive connection member 185 may make contact with both the grounding lines 181 of the protective cover 180 and the exposed first reinforcing member 121, to electrically connect the grounding lines 181 of the protective cover 180 and the first reinforcing member 121 with each other.

In an exemplary embodiment, the conductive connection member 185 may include a metallic adhesive tape. Alternatively, the conductive connection member 185 may include a combining member, such as a screw, which combines the grounding lines 181 with the first reinforcing member 121. Alternatively, instead of the conductive connection member 185, the first reinforcing member 121 may have a grounding hole (not shown) and an end of the grounding lines 181 may be received in the grounding hole of the first reinforcing member 121 so that the first reinforcing member 121 and the grounding lines 181 of the protective cover 180 may be electrically connected to each other.

The panel driving board 175 electrically connected to the protective cover 180 may be grounded to the first reinforcing member 121. Advantageously, according to exemplary embodiments of the present invention, the static electricity induced to the panel driving board 175 and the signal transferring board 174 during manufacturing processes and assembling processes of the display device 100 is transferred to the grounding member 131 and the first reinforcing member 121 through the protective cover 180, so that the static electricity originally induced to the panel driving board 175 and the signal transferring board 174 may be ultimately discharged.

According to exemplary embodiments of the present invention, while connecting the connection flexible printed circuit film 176 with the panel driving board 175 and/or the signal transferring board 174, damage of circuits formed on the panel driving board 175 and the signal transferring board 174 caused by the static electricity may be reduced or effectively prevented.

Referring again to FIGS. 1, 6 and 7, the front receiving container 107 exposes a display area of the display panel 170. The front receiving container 107 may be combined with the middle frame 160 and/or the back receiving container 101. In an exemplary embodiment, the front receiving container 107 may include a chassis formed of a metal. Alternatively, the front receiving container 107 may include a front frame member formed of a plastic material and a third reinforcing member 196.

The front frame member may include a bottom part 192 and a sidewall.

The bottom part 192 of the front frame member may have a substantially rectangular plate shape of which a center portion corresponding to the display area of the display panel 170 is opened. The bottom 192 of the front frame member may cover a peripheral area (e.g., edge) of the display panel 170 which surrounds the display area of the display panel 170.

The sidewall of the first frame member is extended from an edge portion of the bottom 192 and towards the back receiving container 101. The sidewall includes a first sidewall 191, a second sidewall 193, a third sidewall 195, and a fourth sidewall 197. The first to fourth sidewalls 191, 193, 195, and 197 of the front frame member are adjacent to the first to fourth sidewalls 111, 113, 115, and 117 of the back frame member 110, respectively.

Each of the third and fourth sidewalls 195 and 197 of the front frame member may have an internal receiving space which is similar to that of each of the first and second sidewalls 111 and 113 of the back frame member 110, such as to receive the third reinforcing member 196. The third reinforcing member 196 is slid to the internal space of each of the third and fourth sidewalls 195 and 197 and is received in the internal space of each of the third and fourth sidewalls 195 and 197.

The third and fourth sidewalls 195 and 197 may include an external part, an internal part, an upper part, and a lower part which form the internal receiving space of the third and fourth sidewalls 195 and 197. The external part, the internal part, the upper part, and the lower part of the third and fourth sidewalls 195 and 197 may be referred to as solely defining the internal receiving space of the third and fourth sidewalls 195 and 197, respectively. The external part, the internal part, the upper part, and the lower part may collectively form a single, continuous and indivisible unit, and be included as part of the front receiving container 107.

The external part and the internal part face each other, and the third reinforcing member 196 is interposed between the external part and the internal part. The third reinforcing member 196 disposed in the third and fourth sidewalls 195 and 197 may be slidably disposed between the external part and the internal part, such that the third reinforcing member 196 is retained between the external part and the internal part. The first reinforcing member 121 may be solely retained by a friction or interference fit with the external part and the internal part, or may be retained with the assistance of the retaining member, such as the screw. The upper part faces an upper end of the third reinforcing member 196 and connects an upper end of the external part with an upper end of the internal part. The lower part faces a lower end of the third reinforcing member 196 and connects a lower end of the external part with a lower end of the internal part. Inner surfaces of the external part, the internal part, the upper part, and the lower part may completely overlap an entire of the corresponding facing external surfaces of the third reinforcing member 196.

The third reinforcing member 196 may have a size and a shape which are substantially the same as those of the internal receiving space of the third and fourth sidewalls 195 and 197, so that the third reinforcing member 196 may be combined with the third and fourth sidewalls 195 and 197. Each of the third reinforcing members 196 may directly contact all or some of the internal surfaces of the external part, the internal part, the upper part, and the lower part of the third and fourth sidewalls 195 and 197, respectively.

The third reinforcing member 196 is inserted into the internal receiving space of each of the third and fourth sidewalls 195 and 197 along a length direction of each of the third and fourth sidewalls 195 and 197. The third reinforcing member 196 may have a size and a shape which are the substantially the same as those of each of the internal spaces of the third and fourth sidewalls 195 and 197. The third reinforcing member 196 reinforces the strength of the front receiving container 107.

Since the back receiving container 101 and the front receiving container 107 may be formed of a plastic material, the weight of the display device 100 in accordance with exemplary embodiments of the present invention may be advantageously reduced.

The first, second and third reinforcing members 121, 125 and 196, formed of a metallic material, may reinforce the strength of the back frame member 110 and the front frame member including the plastic material. The first reinforcing member 121 and/or the grounding member 131 formed of the metallic material may ground the panel driving board 175 on which a circuit is formed, to reduce or effectively prevent interference by the electromagnetic waves and damage by static electricity to the panel driving board 175.

In addition, since the back frame member 110 is formed of a plastic material, the lamp socket receiver 118 may be integrally formed with the back frame member 110, such as to form a single body of the back frame member 110 including the lamp socket receiver 118. Advantageously, the separate plate for arranging the lamp sockets 143 may be not required so that the manufacturing cost of the display device 100 may be reduced.

Figure 9:
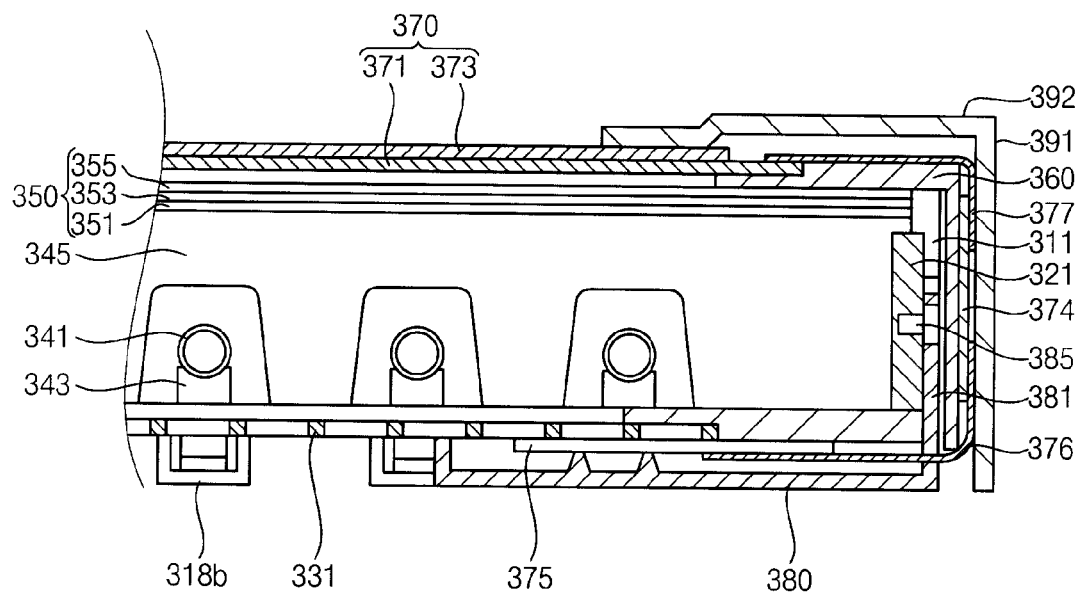
FIG. 9 is a cross-sectional view illustrating another exemplary embodiment of a backlight assembly in accordance with the present invention.
Figure 10:
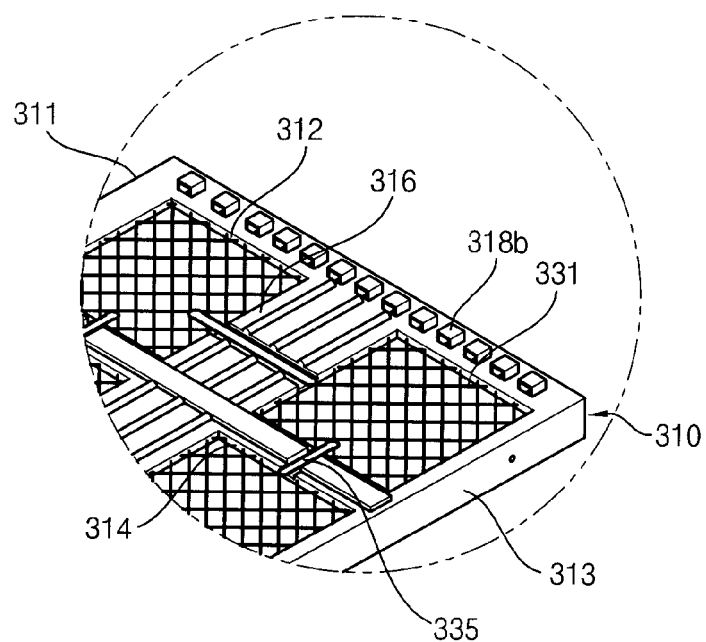
FIG. 10 is a perspective view illustrating an exemplary embodiment of a rear surface of the backlight assembly illustrated in FIG. 9.

FIG. 9 is a cross-sectional view illustrating another exemplary embodiment of a backlight assembly in accordance with the present invention. FIG. 10 is a perspective view illustrating an exemplary embodiment of a rear surface of the backlight assembly illustrated in FIG. 9.

Referring to FIGS. 9 and 10, in a backlight assembly 300, a first reinforcing member 321 is disposed on an internal surface of each of a first sidewall 311 and a second sidewall 313 of a back frame member 310, and a plurality of grounding members 331 are electrically connected to one another. The backlight assembly 300 is the substantially the same as or substantially similar to the backlight assembly 103 illustrated in FIGS. 1 to 8 except for the above-mention technical features. Thus, any repetitive explanation will be omitted.

In an exemplary embodiment, the back frame member 310 may be formed by a molding method. The back frame member 310 includes a bottom part and sidewalls. The bottom part may include an edge part 312 and a plurality of center parts.

In exemplary embodiments of the present invention, each of the first sidewall 311 and the second sidewall 313 has a guide groove formed on an internal surface thereof. The first reinforcing member 321 is disposed in the guide groove. Each of a first center part 314 and a second center part 316 may have a groove connecting adjacent openings of the back frame member 310.

The first reinforcing member 321 is disposed in the guide groove of each of the first and second sidewalls 311 and 313. The first reinforcing member 321 may be exposed by the guide groove of each of the first and second sidewalls 311 and 313.

As illustrated in FIG. 9, the first and second sidewalls 311 and 313 may have openings to expose the first reinforcing member 321.

A grounding line 381 connected to a protective cover 380 may be disposed in the opening of a respective first and second sidewall 311 and 313 exposing the first reinforcing member 321. The grounding line 381 and the first reinforcing member 321 may be combined with each other by a combining member, such as a screw 385.

The backlight assembly 300 may further include a connection member 335. In exemplary embodiments, the connection member 335 may be formed of a conductive material. The connection member 335 is disposed in the groove of each of the first and second center parts 314 and 316, and connects adjacent grounding members 331. As illustrated in FIG. 10, a plurality of connection members 335 are disposed in a plurality of grooves in the first center part 314, and the connection members 335 are extended substantially in a transverse direction of the back frame member 310. The second center part 316 also includes a plurality of connection members 335 disposed in a plurality of grooves formed therein. The connection members 335 of the second center part 316 are extended substantially in a longitudinal direction of the back frame member 310. Advantageously, the grounding members 331 in adjacent openings of the back frame member 310 may be electrically connected to one another by the plurality of connection members 335, so that the panel driving board may be more effectively grounded.

In exemplary embodiments of the present invention, since the back frame member 310 is formed of the plastic material by a molding method, various components may be easily formed in one body with the back frame member 310, such that the various components collectively form a single, continuous and indivisible unit with the back frame member 110. As illustrated in the exemplary embodiment, as shown in FIGS. 9 and 10, lamp socket receivers may be integrally formed with back frame member 310. The lamp socket receivers receive lamp sockets 343 to apply driving voltages to the lamps 341, respectively. Each of the lamp socket receivers may include a contact hole and a socket supporter 318b.

The backlight assembly 300 may further include a plurality of a side frame 345, an optical member 350 and a middle frame 360. The side frames 345 may be disposed adjacent to internal surfaces of sidewalls of the back frame member 130, respectively. Each of the plurality of side frames 345 may include two sidewall portions which are supported by the edge part 312 of the back frame member 310 and an upper portion connecting upper ends of the two sidewall portions. The lamp sockets 343 received in the lamp socket receivers are disposed between the two sidewall portions of a respective side frame 345. In an exemplary embodiment, one of the two sidewall portions may have holes to guide end portions of the lamps 341 into the lamp sockets 343. The upper portion may have a stepped portion to support the optical member 350.

The optical member 350 changes a distribution of light generated by the lamps 141. The optical member 350 may be supported by the upper portions of the side frames 345, and the first and second sidewalls 311 and 313 of the back frame member 310. A lower surface of the optical member 350 may directly contact an upper surface of the upper portions of the side frames 345 and the first and second sidewalls 311 and 313 of the back frame member 310.

The optical member 350 may include a diffusive plate 351, a diffusive sheet 353 and a light concentrative sheet 355, which are sequentially stacked from the upper surface of the upper portions of the side frames 345 and the first and second sidewalls 311 and 313 of the back frame member 310.

The middle frame 360 presses a peripheral edge portion of the optical member 350 to fix the optical member 350 to a predetermined receiving position, and supports a display panel assembly.

The display panel assembly may include a display panel 370, a panel driving board 375 and a source flexible printed circuit film 377. The display panel 370 displays images using the light provided by the backlight assembly 300. The display panel 370 may display the images based on a gate signal and a data signal generated by the panel driving board 375. The display panel 370 may include a lower substrate 371, an upper substrate 373 which is opposite to the lower substrate 371 and a liquid crystal layer interposed between the lower substrate 371 and the upper substrate 373.

The display panel assembly may further include a signal transferring board 374 and a connection flexible printed circuit film 376. The signal transferring board 374 receives a gate control signal and the data control signal, and transfers the gate control signal and the data control signal to a gate driver and a data driver, respectively. The signal transferring board 374 may be disposed on the external surface of the middle frame 360 adjacent to the first sidewall 311 of the back frame member 310, such that the signal transferring board 374 directly contacts the external surface of the middle frame 360. The source flexible printed circuit film 377 may be bond to a side of the signal transferring board 374. The connection flexible printed circuit film 376 electrically connects the panel driving board 375 and the signal transferring board 374 with each other.

The backlight assembly 300 may include a front receiving container formed of a plastic material, and may include a front receiving container reinforcing member, similar to that of the front receiving container 107 of the exemplary embodiments illustrated in FIGS. 1-8. The front receiving container may include a bottom part 392 and a sidewall. The bottom part 392 of the front receiving container may have a substantially rectangular plate shape of which a center portion corresponding to the display area of the display panel 370 is opened. The bottom 392 of the front receiving container may cover a peripheral area (e.g., edge) of the display panel 370 which surrounds the display area of the display panel 370.

The sidewall of the front receiving container is extended from an edge portion of the bottom 392 and towards the back frame member 310 of the backlight assembly 300. The sidewall includes a plurality of sidewalls, including a first sidewall 391, and a second, third and fourth sidewall (not shown). The first sidewall 391 and the second to fourth sidewalls of the front receiving container are all respectively adjacent to the sidewalls of the back frame member 310, respectively.

According to exemplary embodiments of the present invention, the weight and the thickness of the display device may be reduced, and the number of components employed in the display device may be reduced.

The foregoing is illustrative of the present invention and is not to be construed as limiting thereof. Although a few exemplary embodiments of the present invention have been described, those skilled in the art will readily appreciate that many modifications are possible in the exemplary embodiments without materially departing from the novel teachings and advantages of this invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The present invention is defined by the following claims, with equivalents of the claims to be included therein.

What is claimed is:

1. A receiving container comprising:
a frame member including a plastic material, a bottom part of which a center portion is opened, and sidewalls respectively extending from peripheral edges of the bottom part,
wherein the bottom part comprises an edge part defined by the peripheral edges of the bottom part, and a center part which divides the opened center portion into a plurality of sub-openings;
a first reinforcing member completely between an inner surface and an outer surface of one sidewall of the sidewalls and substantially parallel to a length direction of the one sidewall, wherein the first reinforcing member reinforces a strength of the one sidewall, and
a second reinforcing member which is fixed to the center part, wherein the second reinforcing member is parallel to the center part and reinforces a strength of the center part.

2. The receiving container of claim 1, wherein the one sidewall includes a first internal receiving space into which the first reinforcing member is received.

3. The receiving container of claim 2,
wherein the second reinforcing member is substantially parallel to the center part.

4. The receiving container of claim 1, further comprising grounding members respectively overlapping an entire of the sub-openings, the grounding members including a metallic material and having substantially a mesh shape.

5. The receiving container of claim 2, wherein
the frame member further comprises a plurality of lamp socket receivers formed as a single and continuous body with the bottom part of the frame member, and
each of the lamp socket receivers comprises a contact hole extending through the bottom part, and a lamp socket supporter protruding from a rear surface of the bottom part of the frame member, covering the contact hole and supporting a lamp socket inserted into the contact hole.

6. The receiving container of claim 1, wherein
the first reinforcing member is disposed on an internal surface of the one sidewall, and
the first reinforcing member and the one sidewall are combined with each other by a screw.

7. A display device comprising:
a back receiving container comprising:
a back frame member including a plastic material, a bottom part of which a center portion is opened, and sidewalls respectively extending from external sides of the bottom part,
wherein the bottom part of the back frame member comprises an edge part defined by the external sides of the bottom part, internal sides defining the opened center portion of the bottom part, and a center part which divides the opened center portion into a plurality of sub-openings;
a first reinforcing member completely between an inner surface and an outer surface of one sidewall of the sidewalls and substantially parallel to a length direction of the one sidewall, wherein the first reinforcing member reinforces a strength of the one sidewall; and
a second reinforcing member which is fixed to the center part, wherein the second reinforcing member is parallel to the center part and reinforces a strength of the center part;
a backlight assembly received in the back receiving container, the backlight assembly generating light;
a display panel assembly disposed on the backlight assembly, the display panel assembly displaying images using the light; and
a front receiving container exposing a display area of the display panel assembly and combined with the back receiving container.

8. The display device of claim 7, wherein each of two of the sidewalls of the back frame member disposed opposite to each other respectively include first internal receiving spaces, each of the sidewalls receiving the first reinforcing member into the first internal receiving space.

9. The display device of claim 8, wherein the second reinforcing member is substantially parallel to the center part.

10. The display device of claim 7, wherein the front receiving container comprises:
a front frame member formed of a plastic material, the front frame member including a bottom part of which a center portion is opened and exposes the display area of the display panel assembly, the bottom part of the front frame member supporting an edge portion of the display panel assembly, and sidewalls extending from external sides of the bottom part of the front frame member and respectively corresponding to the sidewalls of the back frame member; and
a third reinforcing member separably disposed internally within one sidewall of the front frame member which is substantially perpendicular to the two sidewalls of the back frame member, the third reinforcing member substantially parallel to a length direction of the one sidewall of the front frame member.

11. The display device of claim 10, wherein the one sidewall of the front frame member comprises a second internal receiving space formed therein, the second internal receiving space receiving the third reinforcing member.

12. The display device of claim 8, wherein the display panel assembly comprises:

a display panel including the display area on which the images are displayed using the light;

a panel driving board disposed on a rear surface of the bottom part of the back frame member adjacent to the sidewall of the back frame member including the first reinforcing member, the panel driving board outputting a control signal and controlling image display of the display panel; and a source flexible printed circuit film electrically connecting the panel driving board and the display panel with each other.

13. The display device of claim 12, wherein the back receiving container further comprises:

a plurality of grounding members formed of a metallic material, the grounding members respectively overlapping an entire of the sub-openings and having a substantially mesh shape; and a protective cover disposed on a rear surface of at least one of the grounding members and covering the panel driving board, the protective cover electrically connected to a grounding terminal of the panel driving board and at least one of the grounding members.

14. The display device of claim 13, wherein a portion of the sidewall of the back frame member at which the first reinforcing member is disposed is removed and exposes a portion of the first reinforcing member, and the back receiving container further comprises a conductive connection member electrically connecting the exposed first reinforcing member and the protective cover with each other.

15. The display device of claim 14, wherein the conductive connection member comprises one of a conductive adhesive film attached to the first reinforcing member and the protective cover, and a combining screw combining the first reinforcing member with the protective cover.

16. The display device of claim 14, wherein the display panel assembly further comprises:

a signal transferring board electrically connected to the source flexible printed circuit film and disposed on an external surface of the sidewall of the back frame member at which the first reinforcing member is disposed, the signal transferring board receiving the control signal and applying the data signal for displaying the image to the display panel; and a connection flexible printed circuit film electrically connecting the signal transferring board and the panel driving board with each other.

17. The display device of claim 13, wherein each of the grounding members comprises a connection member protruding from an end portion thereof and making contact with adjacent grounding member.

18. The display device of claim 13, wherein the back frame member further comprises a plurality of lamp socket receivers formed as a single and continuous unit with the bottom part of the back frame member, and each of the lamp socket receivers comprises a contact hole extending through the bottom part of the back frame member, and a lamp socket supporter protruding from a rear surface of the bottom part of the back frame member and covering the contact hole.

19. The display device of claim 18, wherein the backlight assembly comprises:

a reflective member disposed on a front surface of the bottom part of the back frame member and overlapping with the sub-openings;

a plurality of lamps disposed on the reflective member, the lamps being substantially parallel to the first reinforcing member; and a plurality of lamp sockets respectively combined with end portions of the lamps, the lamp sockets inserted into the contact holes of the lamp socket receivers and supported by the lamp socket supporters of the lamp socket receivers, the lamp sockets including portions respectively exposed by the lamp socket receivers.

20. The display device of claim 19, wherein the backlight assembly further comprises a power supplying board disposed on the rear surface of the back receiving container and electrically connected to the lamp sockets.

21. The display device of claim 7, wherein the first reinforcing member is disposed on an internal surface of the one sidewall of the back frame member, and the first reinforcing member is combined with the one sidewall by a combining screw.

* * * * *